US008321362B2

(12) United States Patent
Carrizo et al.

(10) Patent No.: US 8,321,362 B2
(45) Date of Patent: Nov. 27, 2012

(54) METHODS AND APPARATUS TO DYNAMICALLY OPTIMIZE PLATFORMS

(75) Inventors: Carlos Hector Carrizo, Córdoba (AR); Pablo Andrès Garralda, Córdoba (AR)

(73) Assignee: Intel Corporation, Santa Clara, CA (US)

( * ) Notice: Subject to any disclaimer, the term of this patent is extended or adjusted under 35 U.S.C. 154(b) by 519 days.

(21) Appl. No.: 12/644,114

(22) Filed: Dec. 22, 2009

(65) Prior Publication Data

US 2011/0154003 A1  Jun. 23, 2011

(51) Int. Cl.
G06F 17/009 (2006.01)
G06F 9/46 (2006.01)
(52) U.S. Cl. .......................... 706/45; 718/100
(58) Field of Classification Search ................ None
See application file for complete search history.

(56) References Cited

U.S. PATENT DOCUMENTS 7,117,184 B1 * 10/2006 Fontana et al. ............... 706/1
7,500,138 B2    3/2009 Mericas
7,996,346 B2 *  8/2011 Bell et al. ................ 706/25

OTHER PUBLICATIONS

Irelan et al., "Performance Monitoring Unit Sharing Guide," Intel Corporation, downloaded from the Internet on Nov. 2, 2009, (13 pages).

Levinthal, David, "Black Belt Itanium Processor Performance: Performance Monitoring Capabilities (Part 2 of 5)," Intel Corporation, Nov. 20, 2008, (5 pages).
Wikipedia, "Mixture Model," http://en.wikipedia.org/wiki/Mixture_model, last modified on Sep. 11, 2009, (5 pages).
Levinthal, David, "Introduction to Performance Analysis on Intel Core 2 Duo Processors," Intel Corporation, Nov. 30, 2006, (36 pages).
Wikipedia, "Information Theory," http://en.wikipedia.org/wiki/Information_theory, last modified on Oct. 1, 2009, (9 pages).
Levinthal, David, "Analyzing and Resolving multi-core non scaling on Intel Core 2 Processors," Intel Corporation, downloaded from the Internet on Oct. 6, 2009, (13 pages).
Alexandrov et al., "Parallelization Made Easier with Intel Performance-Tuning Utility," Intel Corporation, Intel Technology Journal, vol. 11, Issue 04, published Nov. 15, 2007, (14 pages).

* cited by examiner

*Primary Examiner* — Alan Chen
(74) *Attorney, Agent, or Firm* — Hanley, Flight & Zimmerman, LLC (57) ABSTRACT

Example methods and apparatus to dynamically optimize platforms are disclosed. A disclosed example method includes configuring a processor to operate in a first mode, executing a workload on the processor, and sampling a plurality of registers associated with a performance monitoring unit (PMU). The example method also includes transforming the sampled plurality of registers into a Gaussian signal, partitioning the probabilistic model representation into a plurality of discrete output symbols, and associating one of the plurality of discrete output symbols with the workload based on a probability value associated with the one of the plurality of discrete output symbols.

20 Claims, 9 Drawing Sheets

| WORKLOAD | KNOB SETTINGS | LABEL | PMU |
|---|---|---|---|
| $Wl_A$ | $Conf_A$ | Poor (612) | R1 - x, y, z<br>R2 - a, b, c<br>...<br>Rn |
| $Wl_A$ | $Conf_B$ | Satisfactory | R1 - x, y, z<br>R2 - a, b, c<br>...<br>Rn |
| $Wl_A$ | $Conf_C$ | Good (614) | R1 - x, y, z<br>R2 - a, b, c<br>...<br>Rn |
| $Wl_A$ | $Conf_D$ | Good (616) | R1 - x, y, z<br>R2 - a, b, c<br>...<br>Rn |
| $Wl_A$ | $Conf_E$ | Satisfactory | R1 - x, y, z<br>R2 - a, b, c<br>...<br>Rn |
| $Wl_A$ | $Conf_F$ | Poor | R1 - x, y, z<br>R2 - a, b, c<br>...<br>Rn |
| ... | ... | ... | ... |
| $Wl_B$ | $Conf_A$ | Satisfactory | R1 - x, y, z<br>R2 - a, b, c<br>...<br>Rn |
| $Wl_B$ | $Conf_B$ | Good | R1 - x, y, z<br>R2 - a, b, c<br>...<br>Rn |
| $Wl_B$ | $Conf_C$ | Poor | R1 - x, y, z<br>R2 - a, b, c<br>...<br>Rn |
| $Wl_B$ | $Conf_D$ | Satisfactory | R1 - x, y, z<br>R2 - a, b, c<br>...<br>Rn |
| $Wl_B$ | $Conf_E$ | Good | R1 - x, y, z<br>R2 - a, b, c<br>...<br>Rn |

METHODS AND APPARATUS TO DYNAMICALLY OPTIMIZE PLATFORMS

TECHNICAL FIELD

The present disclosure relates to computer platform configuration, and in particular, to methods and apparatus to dynamically optimize platforms.

BACKGROUND

Computer platforms typically include one or more central processing unit (CPU) settings (knobs) that enable an end user to tailor platform processing to a type of workload that the user expects the platform to execute. CPU settings may be adjusted in a manner that optimizes performance of the platform in view of a workload of interest. In other circumstances, the CPU settings are placed in a default state for a generalized end user.

CPU settings may be enforced and/or implemented by a basic input/output system (BIOS) during a boot process of the computer platform. A number of performance-sensitive processor and platform-specific settings may be exposed via the BIOS settings of the platform. Settings include hardware prefetch settings, second sector prefetch settings, snoop filter settings, high-bandwidth memory option settings and/or hyper-threading settings. In the event that the end user has qualified a type of workload that will be performed by the platform and sets the BIOS accordingly, the platform may perform at its optimum ability for that workload. In other circumstances, improper CPU settings established by BIOS configuration and/or CPU settings that do not match one or more workloads executed by the platform may result in performance limitations of the platform when operating on the workload.

BRIEF DESCRIPTION OF THE DRAWINGS

FIG. 6 is an example label table that may be generated by the example dynamic optimizer of FIGS. 1 and 2.

DETAILED DESCRIPTION

CPU and/or platform-specific settings include, but are not limited to hardware prefetch settings, second sector (also known as adjacent sector) prefetch settings, snoop filter settings, high-bandwidth memory option settings and/or hyper-threading settings. Without limitation, settings may address tradeoffs between performance and power consumption and/or any other operational mode of the example platform (e.g., graphics rendering, numerical processing, audio compression, finite element analysis, etc.). The CPU and/or platform-specific settings (generally referred to herein as "CPU settings" or knobs) may be exposed via BIOS and applied to the platform during boot, while other CPU settings may be applied during run-time of the platform. While proper configuration of the CPU settings may result in the platform operating in an optimum condition, the optimum operating condition of the platform is typically dependent upon the type of workload executed by the platform. In other words, when the platform is configured with a first set of CPU settings, it may operate to the best of its ability (e.g., optimum operation in view of hardware capabilities) for a first workload. However, in the event that the first workload changes to a second workload, the platform may operate relatively poorly when configured with the first set of CPU settings.

In some instances, the platform is delivered to an end user (e.g., from a manufacturer, from a retailer, etc.) having default CPU settings. The default CPU settings may be tailored for a general computing audience (e.g., general word processing, general Internet access, general photo manipulation, etc.) and/or may be tailored for a specific audience (e.g., commerce server, database engine, etc.). End users may not appreciate that the platform performance is dependent upon proper configuration of the BIOS, which may affect one or more CPU settings of the platform. As a result, the end users may experience particularly good operating performance for some workloads, and may experience particularly poor operating performance of the platform for other workloads.

The methods and apparatus described herein facilitate, in part, identification of platform operating characteristics that are indicative of operating performance. For example, the CPU and/or platform hardware may exhibit characteristic attributes or signatures during periods of good operating performance and alternate characteristic signatures during periods of relatively poor operating performance. The methods and apparatus described herein perform one or more tests on a platform of interest using different settings (knobs) while it is executing a workload of interest in an effort to identify signatures exhibited by the platform during instances of good operating performance and poor operating performance. Additionally, the example methods and apparatus described herein generate one or more rules associated with each operating state of the platform. For example, in the event that the platform is identified as operating poorly, a corresponding rule may be invoked that is based on, in part, the CPU settings, the platform type and/or the workload being executed by the platform. For instance, if the CPU is configured with a knob configuration "A," and the platform is performing poorly when challenged with a workload related to graphics rendering, a corresponding rule may be invoked to change the CPU knob setting to configuration "B." When the rule is invoked, knob settings are adjusted to cause the example platform to operate in a manner indicative of good performance.

Figure 1:
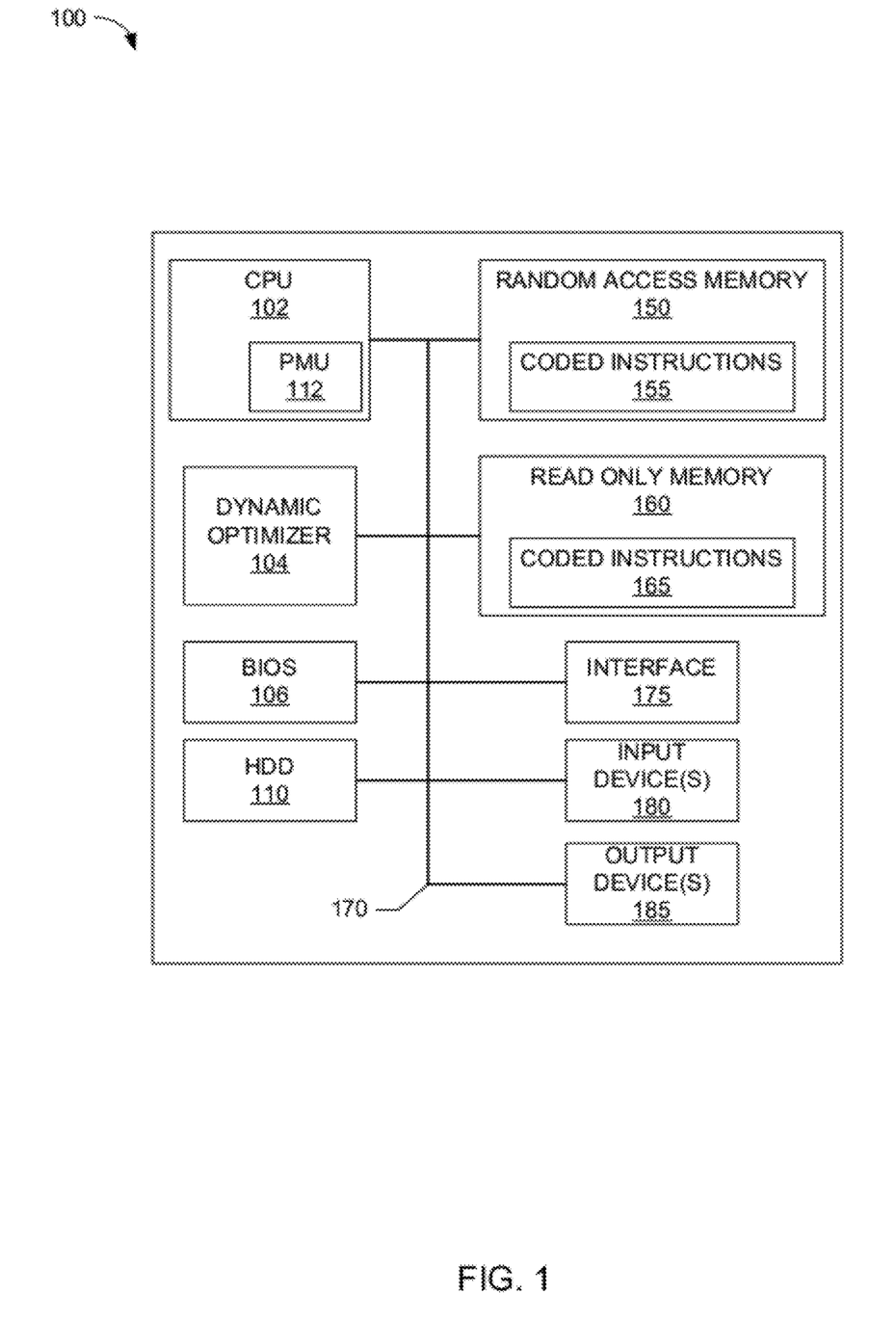
FIG. 1 is a block diagram of an example platform that may be used by the methods and apparatus described herein to dynamically optimize a platform.

FIG. 1 is a schematic illustration of an example platform 100 that may be used with the methods and apparatus described herein. In the illustrated example of FIG. 1, the platform 100 includes a CPU 102, a dynamic optimizer 104, a BIOS 106, a memory 150, 160 and a hard disk drive (HDD) 110. The example CPU 102 includes a performance monitoring unit (PMU) 112, which may include any number of counters/registers, each of which correspond to an instruction processing event. The example PMU 112 may generate a signal and/or increment a register to indicate the occurrence of a corresponding instruction and/or event within the example CPU 102. The example platform 100 of FIG. 1 may include any number of additional and/or alternate components and may be implemented by one or more general-purpose processors, processor cores, microcontrollers, etc.

The example CPU 102 of platform 100 may execute coded instructions 155 and/or 165 present in main memory of the CPU 102 (e.g., within a RAM 150 and/or a ROM 160). The CPU 102 may be any type of processing unit, such as a processor core, a processor and/or a microcontroller. The CPU 102 may execute, among other things, the example processes of FIGS. 3, 4, 5 and 7 to implement the example methods and apparatus described herein, and described in further detail below.

The CPU 102 is in communication with the main memory (including the ROM 160 and/or the RAM 150) via a bus 170. The RAM 150 may be implemented by dynamic random access memory (DRAM), synchronous dynamic random access memory (SDRAM) and/or any other type of RAM device, and ROM may be implemented by flash memory and/or any other desired type of memory device. Access to the memory 150 and the memory 160 may be controlled by a memory controller (not shown). The example memory 150 may be used to implement an example PMU data store, as described in further detail below.

The example platform 100 also includes an example interface circuit 175. The interface circuit 175 may be implemented by any type of interface standard, such as an external memory interface, serial port, general-purpose input/output, etc. One or more input devices 180 and one or more output devices 185 are connected to the interface circuit 175.

The example platform 100 of FIG. 1 may be used and/or programmed to implement any or all of the example dynamic optimizer 104 of FIGS. 1 and 2, and/or an example workload manager 202, knob manager 204, PMU manager 206, PMU data store 208, data cleaning manager 210, condition label manager 212, decision function manager 213, error probability manager 214, PMU threshold manager 216 and/or a condition rule manager 218 of FIGS. 1 and 2, and described in further detail below.

Although the illustrated example of FIG. 1 shows the dynamic optimizer 104 external to the CPU 102, the dynamic optimizer 104 could be integrated within the CPU 102 without limitation. Alternatively, the example dynamic optimizer could be communicatively connected to the CPU 102 in a manner external to the platform 100, without limitation.

In operation, the example dynamic optimizer 104 monitors the example PMU 112 and acquires data related to PMU 112 counter values during differing operating conditions of the example platform 100. Generally speaking, a platform 100 condition includes a pattern of PMU 112 counters exhibited during the execution of a platform workload (e.g., running a web browser, running a word processor, performing a database query, calculating a transform, etc.) for a given CPU 102 knob setting. Each condition may be associated with a label indicative of a relative degree of platform performance including a "good" label to indicate good platform performance, a "poor" label to indicate poor platform performance, an "optimum" label to indicate platform performance at a degree better than previously observed and/or a "satisfactory" label to indicate the minimum acceptable standards of operation for the example platform 100. Each condition exhibited by the example platform 100 when executing a workload may be associated with one or more PMU 112 signatures. For example, because the example PMU 112 may include any number of registers/counters (e.g., hundreds of counters, thousands of counters, etc.), identifying one or more PMU signatures that correspond to a specific operating condition may be difficult. A number of training runs are invoked by the example dynamic optimizer 104 that acquire PMU 112 counter data for a CPU 102 knob setting(s) that exhibit good platform performance (e.g., a good label), and PMU 112 counter data for the CPU 102 knob setting(s) that exhibit poor platform performance (e.g., a poor label). As described in further detail below, the example dynamic optimizer 104 applies statistical modeling and/or Information Theory technique(s) to minimize data dynamics and estimate which PMU signature(s) may be used to identify a specific platform operating condition if/when it occurs again during a run-time scenario.

Principles of Information Theory identify coding and/or encoding that can achieve a detection error probability for a communication channel. Generally speaking, Information Theory analyzes a communication channel in connection with input symbols and corresponding output symbols after propagation through the communication channel. The communication channel may include, but is not limited to a wire through which data is transmitted and/or received. Additionally, Information Theory may also analyze the communication channel in view of noise influence(s) and a resulting probability of determining the correct input signal based on an observed output signal. While the Shannon-Hartley theorem predicts the existence of coding that assures an arbitrary error probability in the detection of the transmitted symbols, the Shannon-Hartley theorem does not provide a direct derivation of such codes, a decoder and/or mechanism to estimate symbols propagated through a channel.

The methods and apparatus described herein include, in part, creation of a known coding schema, creation of a known set of symbols that can be transmitted (e.g., 1's and 0's) through a channel, and development of a decoder to estimate the probability of the input symbols based on observed output symbols. Although an a-priori knowledge of the probability distribution for one or more input symbols is not available, the methods and apparatus described herein generate one or more estimates of such probability distribution(s) by first creating a training set that is representative of candidate input symbols (e.g., known platform workload conditions) to be expected so that statistical estimators for corresponding output symbols can be derived. For example, a channel may transmit a set of input symbols as shown in example Equation 1.

$$InSymb=[A,B] \qquad \text{Equation 1.}$$

In the illustrated example Equation 1, A and B each represent symbols transmitted on a channel, where the symbol for A could be 1 and the symbol for B could be 0. In some examples, each symbol may be repeated a number of times to ascertain the ability of the channel to produce the predicted output (e.g., A could be 111, B could be 000). During transmission through the communication channel, corresponding output symbols will, under ideal circumstances, mimic the transmitted input symbols exactly. However, due to noise and/or other interference, example output symbols as shown in Equation 2 may result.

$$OutSymb=\{\text{``000''},\text{``001''},\ldots,\text{``110''},\text{``111''}\} \qquad \text{Equation 2.}$$

Depending on the effect of noise, different bits may change during transmission through the channel. To determine the odds (probability) of receiving the output symbol A versus the output symbol B, training sets may be transmitted and sampling collects results of such training sets to calculate a probability distribution of each input symbol based on the observed output.

While traditional Information Theory considers a channel of communication akin to a wire and/or any other medium through which information may be transmitted and/or received, the methods and apparatus described herein employ the example computer platform 100 as an analogy to the communication channel. Additionally, while traditional Information Theory considers an input signal as symbols transmitted into the channel (e.g., input of 1's and/or 0's), the methods and apparatus described herein employ a workload executing on the platform as analogous to the input signal(s). Moreover, while traditional Information Theory considers an output signal as symbols received from the channel (e.g., 1's and 0's), the methods and apparatus described herein employ one or more PMU registers/counters as analogous to the output signal(s).

At least one objective of the methods and apparatus described herein is to apply Information Theory in a manner that reveals a performance status of a platform, a computer and/or any other processing device and/or system. More specifically, one objective includes, but is not limited to detecting a situation in which a particular workload (e.g., a set of programs executed by the example CPU 102) is not performing in an optimized manner when the CPU 102 is configured with a particular knob setting. Additionally, at least one other objective of the methods and apparatus described herein includes identifying at least one alternate knob configuration for the example CPU 102 that will cause the CPU 102 and/or overall example platform 100 to perform in an improved manner.

To apply Information Theory to a computing system in a manner that allows detection of one or more computing system operating conditions that is either optimized or in need of alternate CPU 102 knob settings, a relationship between a given workload ($Wl_X$) and knob settings ($Conf_X$) is identified for any number of labeled conditions. For example, one workload may cause the platform 100 to execute particularly well when the knob settings are in a first configuration, yet the example platform 100 may execute particularly poorly when those same knob settings are active during a second workload. Labeled conditions may include, but are not limited to "good," "optimum," "satisfactory," and "poor." As described in further detail below, identifying workload labels may include objective tests in view of industry standard metrics and/or empirical observation of knob settings and corresponding platform 100 performance.

Typically, the number of workloads that the example platform 100 can execute outnumbers the number of possible system knob configurations. As such, the possibility exists that any number of workloads might map to a single knob setting ($Conf_X$) when the platform is operating particularly well (e.g., corresponding to an "optimum" label). While the methods and apparatus described herein may be able to identify which workloads are currently executing at a given time, other circumstances may not reveal the exact workload, but, instead, allow a generalized workload to reveal an indication of whether or not the knob setting (e.g., $Conf_X$) should be adjusted. Information Theory, as applied to the methods and apparatus described herein, considers the example platform 100 and/or PMU 112 in a manner analogous to a communication channel, considers sets of different kinds of workloads in a manner analogous to input symbols, and considers PMU counter samples (e.g., values from each register of the PMU 112) as analogous to output sequences. For each candidate system configuration (e.g., knob setting $Conf_X$), the methods and apparatus described herein calculate a set of estimators to allow an inference to which workload set is currently being executed by the platform 100. Additionally, the methods and apparatus described herein identify whether the combination of the current workload and the current system configuration are ideal (e.g., associated with an "optimum" label), or non-ideal (e.g., associated with a "poor" label).

Figure 2:
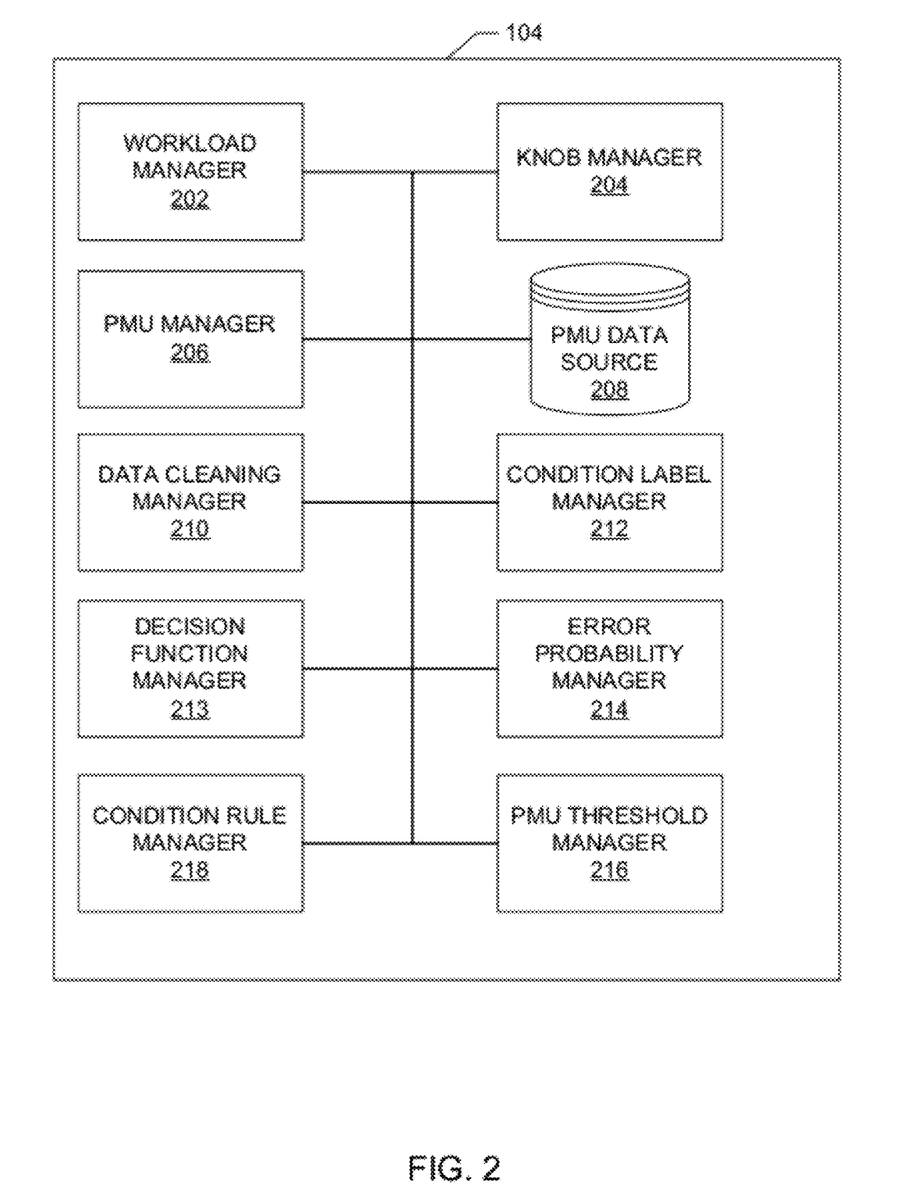
FIG. 2 is a block diagram of a dynamic optimizer that may be implemented by the example platform of FIG. 1.

FIG. 2 is a schematic illustration of the example dynamic optimizer 104 of FIG. 1. In the illustrated example of FIG. 2, the dynamic optimizer 104 includes a workload manager 202, a knob manager 204, a PMU manager 206, a PMU data store 208, and a data cleaning manager 210. The example dynamic optimizer 104 of FIG. 2 also includes a condition label manager 212, a decision function manager 213, an error probability manager 214, a PMU threshold manager 216, and a condition rule manager 218.

The example workload manager 202 configures the example platform 100 to operate under a given set of conditions and/or perform a predetermined series of steps during a simulation to identify one or more PMU signatures. Workload configuration managed by the example workload manager 202 may include, but is not limited to executing a repeating loop of instructions for a predetermined amount of time and/or a predetermined number of cycles. For example, the workload manager 202 may configure the example platform 100 to perform a series of execution cycles that query a database for predetermined keywords and populate the database with an entry at each cycle. The series of execution cycles performed by the example platform 100 may not result in value added work, but rather allow the example dynamic optimizer 104 to collect any number of PMU 112 signatures while the platform is stressed by the given workload configuration.

While the example workload manager 202 is stressing the platform 100 with one or more particular workloads, the example knob manager 204 configures the CPU 102 to operate in an operating mode, thereby allowing the example dynamic optimizer 104 to characterize the platform under controlled conditions. Generally speaking, each CPU in a platform may have any number of operating modes invoked by one or more settings unique to the CPU, unique to the platform and/or unique to the combination of CPU and platform. The CPU knobs (or settings) may have default settings according to validation benchmarking before the platform 100 is shipped to an end user, but CPU knobs may not operate well based on the type of workloads employed by that end user. In other words, some CPU knobs may exhibit particularly good performance effects for the platform in certain workload instances, yet suffer significant performance effects during other workload instances. As such, for each platform workload configured by the example workload manager 202, the example knob manager 204 maintains the platform 100 in one knob state so that PMU signatures may be acquired in a consistent manner. As described in further detail below, after collecting any number of PMU signatures in a first knob state, the example knob manager 204 adjusts the knob settings of the example CPU 102 so that additional PMU signatures can be acquired for that same workload in view of the alternate knob settings. In other words, additional PMU signature data may be acquired to reveal an indication of how the knob settings affect the ability of the platform 100 to perform well or to perform poorly. To that end, when the platform 100 operates in a run time scenario (e.g., the platform 100 is used by an end user), the example dynamic optimizer 104 may identify the current operating state as good or poor. If the state is deemed good, then knob changes to the platform do not need to occur. On the other hand, if the state is deemed poor, then knob changes may allow the platform to execute better, faster and/or more efficiently.

The example PMU manager 206 identifies the type of PMU employed by a CPU of a given platform. In some examples, the PMU is specific to a particular CPU manufacturer/model, may have manufacturer/model-specific counters/registers, a manufacturer/model-specific interface and/or any other traits that may differ from a PMU of an alternate manufacturer/model. In other examples, the PMU 112 employed by the CPU 102 may be part of a family of CPU architecture common to any number of CPU models. Information related to available counters, registers and/or model specific registers (MSUs) may be acquired by the PMU manager 206 after querying a data store 208 that may contain information unique to the PMU 112 employed by the CPU 102 of interest. As additional and/or alternate PMUs become available and/or known, details related to such PMUs may be added to the example PMU data store 208 so that available MSUs can be observed by the dynamic optimizer 104 during one or more test runs of the platform 100 while it is experiencing a workload of interest, thereby allowing the example dynamic optimizer to characterize the platform 100.

The example data cleaning manager 210 may be employed by the example dynamic optimizer 104 to remove or minimize errors in collected PMU data caused by, for example, noise and/or data dynamics. In operation, the example data cleaning manager 210 filters the acquired PMU data and statistically models it as a Gaussian mixture model. Other statistical models may be employed to allow easier manipulation of the acquired PMU data, without limitation. Each group of acquired PMU data that is associated with a platform of interest and a workload of interest for knob settings of interest may be referred to as a training set. The training set may perform well, perform poorly and/or perform somewhere in-between either extreme of well or poor (e.g., the training set may perform satisfactorily). The example condition label manager 212 applies a label to the training set to associate it with an indication of how well or poorly the combined platform of interest, workload of interest and knob settings of interest execute. Labels may be assigned to the training set by way of, for example, comparison to one or more benchmarking standards and/or empirical observations.

Identification of a PMU signature that corresponds to a training set may include a substantial number of data points, noise and/or one or more combinations of PMU register values indicative of the training set. Such a challenge may be analogous to the field of Information Theory that is directed to, in part, identifying a transmitted message from one or more readings (data acquisition) within a noisy and/or distorted communication channel. Generally speaking, Information Theory is based on probability theory and statistics, which may be employed to quantify a number of bits needed to describe transmitted data. Data may include anything transmitted on a channel such as, for example, a series of binary bits (1's and 0's) transmitted on a wire from a source to a receiver. While the expected symbols at the receiver are the binary bits, noise and/or distortion along the channel may expose a challenge when attempting to distinguish which symbol is actually being received. In some examples, the symbol(s) expected at the receiver are voltage values in a wire, while more complex scenarios may monitor one or more combinations of voltage, timing, phase angle and/or other electrical and/or timing parameters. As the number of candidate symbols transmitted by a source increases, the challenge of correctly identifying such symbols at a receiver also increases. Continuing with the analogy between identification of PMU signatures and Information Theory, the example PMU 112 may have any number of candidate counters/registers in which one or more combinations of such counters/registers and their corresponding values may reflect the occurrence of an operating condition (e.g., a good operating condition, a poor operating condition, etc.) for the example platform 100.

The example decision function manager 213 facilitates, in part, a mapping of PMU output information to input information. In other words, the example decision function manager 213 maps a sub-range of PMU values to an active workload being executed by the platform 100. As described in further detail below, the maximum likelihood rule may be employed by the decision function manager 213 to generate a decision function $D_\delta$ with a minimum error probability, where δ represents one of the PMU 112 registers.

The example error probability manager 214 estimates a PMU 112 detection error probability for each PMU signature and/or each PMU register based on one or more symbol(s) (counter(s)/register(s)) so that each PMU signature can be ranked as a good estimator for identifying the operating state of the example platform 100. As described in further detail below, PMU signatures and/or the registers that make-up the PMU 112 may be ranked based on having the highest distance (as measured in terms of error probability) between a good label and a poor label. After identifying the best PMU signatures for identifying the platform 100 operating state, the example PMU threshold manager 216 establishes a threshold to distinguish between each good label state and poor label state. One or more rules may be generated by the example condition rule manager 218 based on a given operating condition of interest for the platform 100. For example, if the operating condition for the platform 100 includes a workload, a knob setting, and a label indicative of poor performance, then the example condition rule manager 218 may invoke a rule to adjust the knob settings in an effort to improve the operating conditions of the platform 100. After the alternate knob settings are applied, the example dynamic optimizer 104 may verify whether the platform 100 is operating in an improved manner by detecting a PMU signature associated with such good performance.

While the example platform 100 and dynamic optimizer 104 of FIGS. 1 and 2 have been shown to identify platform 100 operating characteristics that are indicative of operating performance, one or more of the elements and/or devices illustrated in FIGS. 1 and 2 may be combined, divided, re-arranged, omitted, eliminated and/or implemented in any other way. Further, the example dynamic optimizer 104, the workload manager 202, the knob manager 204, the PMU manager 206, the PMU data store 208, the data cleaning manager 210, the condition label manager 212, the decision function manager 213, the error probability manager 214, the PMU threshold manager 216 and/or the condition rule manager 218 of FIGS. 1 and 2 may be implemented by hardware, software and/or firmware. Thus, for example, any of the example dynamic optimizer 104, the workload manager 202, the knob manager 204, the PMU manager 206, the PMU data store 208, the data cleaning manager 210, the condition label manager 212, the decision function manager 213, the error probability manager 214, the PMU threshold manager 216 and/or the condition rule manager 218 of FIGS. 1 and 2 may be implemented by one or more circuit(s), application specific integrated circuit(s) (ASIC(s)), programmable logic device(s) (PLD(s)), and/or field programmable logic device(s) (FPLD(s)), etc. When any of the appended apparatus claims are read to cover a purely software and/or firmware implementation, at least one of the example dynamic optimizer 104, the workload manager 202, the knob manager 204, the PMU manager 206, the PMU data store 208, the data cleaning manager 210, the condition label manager 212, the decision function manager 213, the error probability manager 214, the PMU threshold manager 216 and/or the condition rule manager 218 of FIGS. 1 and 2 are hereby expressly defined to include a tangible medium such as a memory, DVD, CD, etc. storing the software and/or firmware. Further still, the example dynamic optimizer 104, the workload manager 202, the knob manager 204, the PMU manager 206, the PMU data store 208, the data cleaning manager 210, the condition label manager 212, the decision function manager 213, the error probability manager 214, the PMU threshold manager 216 and/or the condition rule manager 218 of FIGS.

1 and 2 may include one or more elements, processes and/or devices in addition to, or instead of, those illustrated in FIGS. 1 and 2, and/or may include more than one of any or all of the illustrated elements, processes and devices.

FIGS. 3, 4, 5 and 6 illustrate example processes that may be performed to implement the example dynamic optimizer 104 of FIGS. 1 and 2. The example processes of FIGS. 3, 4, 5 and 6 may be carried out by a processor, a controller and/or any other suitable processing device. For instance, the example processes of FIGS. 3, 4, 5 and 6 may be embodied in coded instructions stored on any tangible computer-readable medium such as a flash memory, a CD, a DVD, a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium that can be used to carry or store program code and/or instructions in the form of machine-readable instructions or data structures, and that can be accessed by a processor, a general-purpose or special-purpose computer, or other machine with a processor (e.g., the example processor platform 100 discussed above in connection with FIG. 1). Combinations of the above are also included within the scope of computer-readable media. Machine-readable instructions comprise, for example, instructions and/or data that cause a processor, a general-purpose computer, a special-purpose computer, or a special-purpose processing machine to implement one or more particular processes. Alternatively, some or all of the example processes of FIGS. 3, 4, 5 and 6 may be implemented using any combination(s) of ASIC(s), PLD(s), FPLD(s), discrete logic, hardware, firmware, a special purpose CPU (e.g., a graphics CPU), etc. Also, one or more operations of the example processes of FIGS. 3, 4, 5 and 6 may instead be implemented manually or as any combination of any of the foregoing techniques, for example, any combination of firmware, software, discrete logic, and/or hardware. Further, many other methods of implementing the example operations of FIGS. 3, 4, 5 and 6 may be employed. For example, the order of execution of the blocks may be changed, and/or one or more of the blocks described may be changed, eliminated, sub-divided, or combined. Additionally, any or all of the example processes of FIGS. 3, 4, 5 and 6 may be carried out sequentially and/or carried out in parallel by, for example, separate processing threads, processors, devices, discrete logic, circuits, etc.

Figure 3:
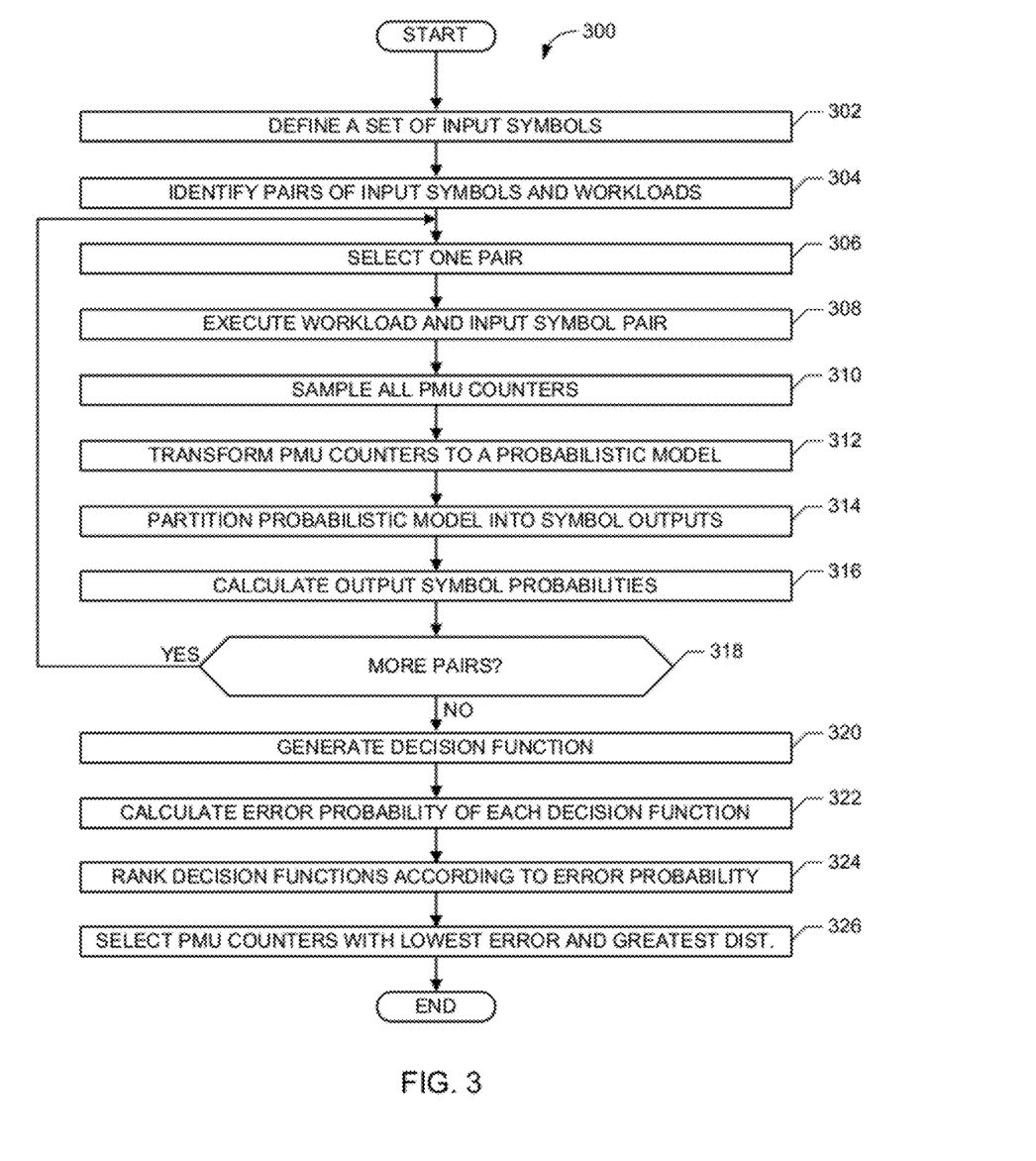
FIGS. 3, 4, 5 and 7 are example processes that may be carried out using tangible machine readable instructions to implement the example dynamic optimizer of FIGS. 1 and 2.

The example process 300 of FIG. 3 begins with defining a set of input symbols (block 302). As described herein, input symbols may represent the possible performance status of the example platform 100 and may also describe which knob configuration may be most beneficial for a platform 100. Example Equation 3 illustrates a set of input symbols for a number of different platform 100 knob configurations (and/or CPU configurations).

$$\text{InSymb}=\{\text{Conf}_A,\text{Conf}_B,\text{Conf}_C,\text{Conf}_D,\ldots\} \quad \text{Equation 3.}$$

In the illustrated example of Equation 3, $\text{Conf}_A$ represents one or more knob settings different from $\text{Conf}_B$, $\text{Conf}_C$, etc. In the event that a current configuration is associated with knob settings that correspond to $\text{Conf}_A$, then for some workloads $\text{Conf}_A$ will be the best configuration for the example platform 100, while other workloads may perform better with an alternate knob configuration, such as $\text{Conf}_B$. Continuing with the analogy between the example platform 100 and principles associated with Information Theory, the example PMU 112 counters/registers are analogous to a communication channel, and output symbols represent one or more values associated with each of those counters/registers (PMU Counters). As such, for a given knob configuration the behavior of an executing workload may be monitored by way of the values generated by the PMU 112 and, a decision of whether to keep the current knob configuration (e.g., $\text{Conf}_A$) or switch to an alternate knob configuration (e.g., $\text{Conf}_B$) may be made based on a decision function.

The example workload manager 202 identifies pairs of input symbols (e.g., a CPU knob configuration) and workloads (e.g., $\text{Wl}_A$, $\text{Wl}_B$, etc.) (block 304) that may represent particularly good platform 100 operation or represent particularly poor platform 100 operation. One of the pairs is selected by the example condition label manager 212 (block 306) and the workload is executed while the CPU 102 is set at the selected configuration (e.g., $\text{Conf}_A$) (block 308). While the example CPU 102 is executing the selected workload at the selected configuration, the example PMU manager 206 collects samples of PMU counters/registers (block 310). Samples may be collected on a periodic basis, such as a measurement of each PMU counter every ¼ second (quarter-second) in which a value of each counter is saved. The methods and apparatus described herein are not limited to ¼ second, but any other period may be employed. As described above, the example PMU 112 may have any number of counters, each of which may be represented by example Equation 4.

$$\text{PMU\_Counter}=\{\alpha,\beta,\delta,\ldots,\omega\} \quad \text{Equation 4.}$$

In the illustrated example Equation 4 above, each of $\alpha$, $\beta$, $\delta$, and $\omega$ may represent one of any number of PMU counters of the example PMU 112. The example PMU manager 206 may acquire sampling $S_A$ to reflect collected PMU counter samples for workload $\text{Wl}_A$ under CPU 102 configuration $\text{Conf}_A$, where relative platform 100 performance is very good. On the other hand, a separate iteration through the example process 300 of FIG. 3 may acquire sampling $S_B$ to reflect collected PMU counter samples for workload $\text{Wl}_B$ under CPU 102 configuration $\text{Conf}_A$, where, in the illustrated example, the relative platform performance is poor (i.e., $\text{Wl}_B$ performs best in $\text{Conf}_B$). In other words, the example PMU manager 206 may run any permutation of workloads ($\text{Wl}_X$) and configurations ($\text{Conf}_X$) and associate an appropriate label thereto. After any number of samples are collected by the example PMU manager 206, the example data cleaning manager 210 transforms the collected samples into a probabilistic model (block 312). Generally speaking, the probabilistic representation is a probability distribution for the values of the PMU counters associated with the example PMU 112. Probabilistic model representation(s) of the collected samples may be generated by, for example, employing a Gaussian Mixture Model (GMM), but the methods and apparatus described herein are not limited thereto.

The example PMU 112 is considered analogous to a communication channel in view of Information Theory, and the PMU 112 counters are considered analogous to output from the communication channel. The example GMM captures a statistical distribution of the values of each PMU counter, but the GMM is a continuous function. The actual probability for each PMU counter can only be calculated for a range/interval of values. To realize meaningful information from a continuous function such as a GMM, the area of the function (e.g., the integral of the function) is measured between two values [a, b], which corresponds to the probability of a PMU counter to output a value in the range between [a, b]. The example data cleaning manager 210 partitions the probabilistic representation into a number of symbol outputs (block 314) (e.g., intervals), producing a discrete number of symbols, as shown in example Equation 5.

$$OutSymb(\delta) = \{O_1^\delta, O_2^\delta, \ldots, O_i^\delta, \ldots, O_{n-1}^\delta, O_n^\delta\} \quad \text{Equation 5.}$$

In the example of Equation 5, n represents the number of sub-ranges (intervals) or output symbols associated with the PMU counter ($\delta$). The example data cleaning manager 210 selects sub-ranges that are small enough to maintain as much information from the original continuous function (i.e., the probabilistic representation, such as a Gaussian model), but not so small as to cause overhead burden(s) (e.g., CPU 102 processing resources). Using the GMM and calculating probability distribution information associated with input and output symbols (block 316), a decision function for each PMU counter can be calculated, as described in further detail below. More specifically, marginal probabilities and conditional probabilities are calculated (block 316) to define a decision function associated with a selected PMU counter.

In the illustrated example of FIG. 3, the data cleaning manager 210 extracts an amount of sampling data (e.g., $S_A$) for each of the input workloads (e.g., $S_A$ during an observed good performance under knob settings $Conf_A$). The marginal probability of input symbols when a given workload works best may be designated as shown in example Equation 6.

$$P(Conf_A), P(Conf_B), \text{etc.} \quad \text{Equation 6.}$$

Similarly, the marginal probabilities of output symbols are calculated as probability distributions of values for each PMU counter (e.g., a histogram of each PMU counter $\delta$). The marginal probability of each output symbol may be represented as $P(O_i^\delta)$, where $\delta$ is a PMU counter and i is the index of a sub-range.

On the other hand, conditional probabilities are calculated because, in part, during the sampling (block 310) outputs were observed with the knowledge of what the corresponding inputs (e.g., workload conditions, such as $Wl_A$) were. As such, with the example probabilistic representation (e.g., GMM), a probability of a given output symbol given a particular input symbol can be calculated and is represented by example Equation 7.

$$P(O_i^\delta | Conf_X) = GMM_{Wl_X|\delta}^i \quad \text{Equation 7.}$$

In the illustrated example of Equation 7, $Wl_X$ represents the workload corresponding to the input knob configuration that works best in $Conf_X$, and $GMM_{Wl_X}$ is the application of the Gaussian Mixture Model (e.g., or any other probabilistic model) generated with workload $Wl_X$ for the PMU counter $\delta$ in the sub-range i.

The conditional probability of an input symbol given that a particular output symbol has been observed may be represented by example Equation 8.

$$P(Conf_X | O_i^\delta) \quad \text{Equation 8.}$$

To calculate the probabilities in example Equation 8, which may be used to define decoding and/or a decision function for a PMU counter ($\delta$), the Bayes Theorem may be employed, as shown in example Equation 9.

$$P(Conf_X | O_i^\delta) = \frac{P(O_i^\delta | Conf_X) P(Conf_X)}{P(O_i^\delta)}. \quad \text{Equation 9}$$

In the event that there are additional pairs of input symbols and workloads for which to acquire samples (block 318), control returns to block 306. Otherwise, the example decision function manager 213 generates a decision function to map an output symbol to an input symbol (block 320). To generate and/or otherwise calculate a decision function ($D_\delta$) (for each PMU counter $\delta$) having a minimal error probability, the maximum likelihood rule may be employed to identify which input symbol has a maximum probability of occurring. Example Equations 10 and 11 illustrate a decision function for a PMU counter ($\delta$).

$$D_\delta(O_i^\delta) = (Conf_X). \quad \text{Equation 10}$$
such that
$$P(Conf_X | O_i^\delta) \geq (Conf_Y | O_i^\delta) \quad \text{Equation 11}$$
for all $Y \in OutSymb(\delta)$.

As shown in the example Equations 10 and 11, a decision function $D_\delta$ exists for each PMU counter ($\delta$). Each decision function D includes an associated error probability, which may be calculated as shown in example Equation 12 (block 322).

$$\varepsilon(D_P) = 1 - \sum_{O_i^\delta} P(D_P(O_i^\delta) | O_i^\delta) P(O_i^\delta) \quad \text{Equation 12}$$

where $O_i^\delta \in OutSymb(\delta)$.

In the illustrated example of Equation 12, $P(D_P(O_i^\delta)|O_i^\delta)$ is the estimated probability of inferring input symbol $(Conf_X)$ $=D_\delta(O_i^\delta)$ correctly.

In the illustrated example of FIG. 3, the condition rule manger 218 ranks the decision function(s) according to how good they are in terms of inferring which configuration will work best within an existing workload condition (block 324). Additionally, the example PMU threshold manager 216 may compare the best decision function(s) (e.g., those having the lowest error probability) with other factors that may be suitable for selecting one or more example PMU counters to illustrate which workload the platform 100 is executing (block 326). As described in further detail below, one or more PMU counters are used to detect "good" or "poor" operation conditions in a given configuration. The relative distance between a "good" and a "poor" operating condition may be calculated by the example PMU threshold manager 216 to select candidate PMU signatures based on a minimal amount of overlap between the signatures of "good" and "bad" operation conditions, thereby allowing a higher degree of state detection confidence.

While the illustrated example of FIG. 3 is described in connection with FIGS. 1 and 2, one or more blocks of the example process 300 may be executed and/or otherwise implemented on any computing device. In some examples, blocks 312 through 326 may be executed on a separate device (s).

Figure 4:
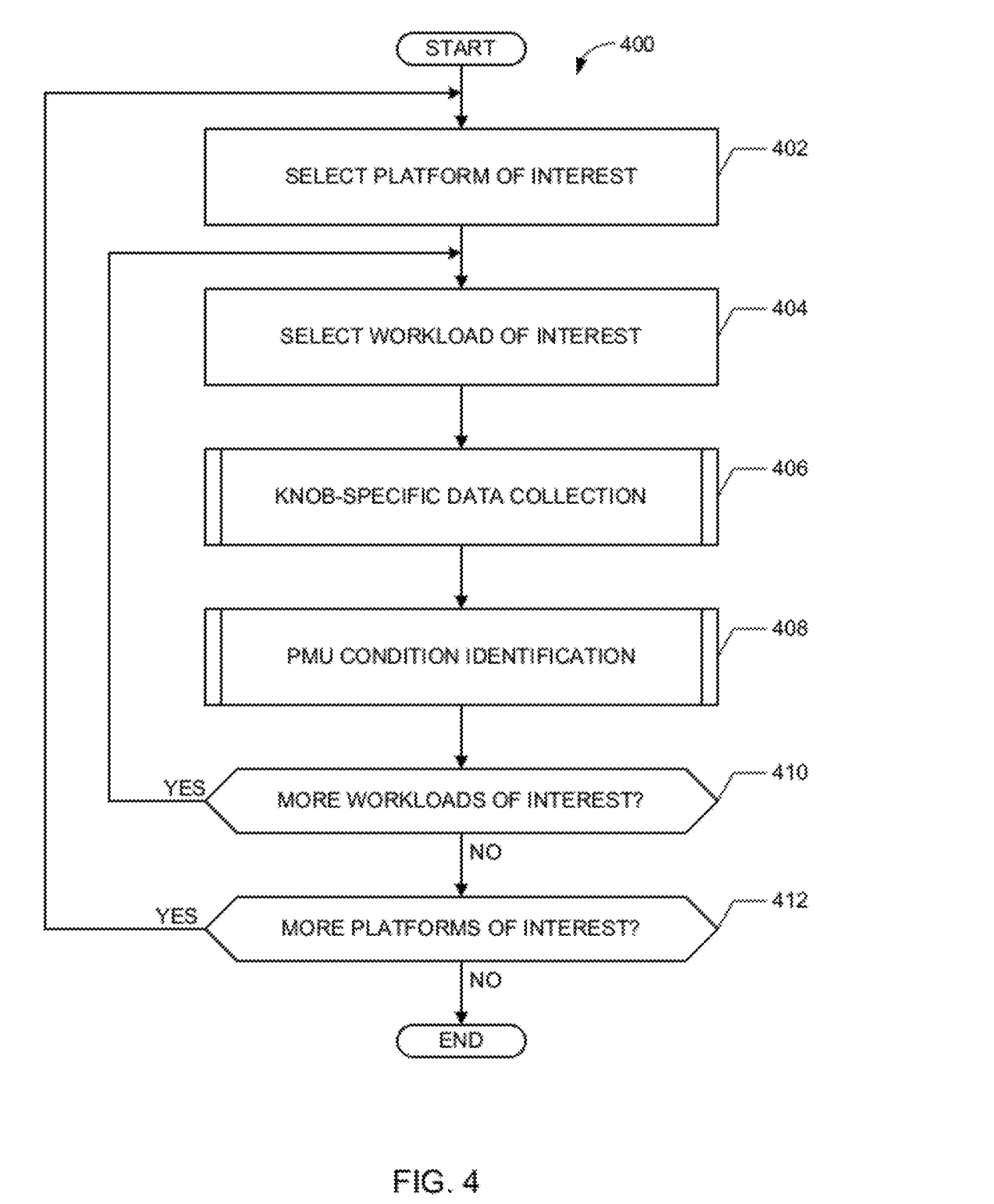

FIG. 4 illustrates another example process 400 to implement the example dynamic optimizer 104. The example process 400 of FIG. 4 begins with selecting a platform of interest (block 402). Platforms (e.g., computer platforms, hardware architectures, software frameworks, etc.) may include any number of elements to facilitate software execution. Some of the elements that may be used with a platform include, but are not limited to one or more CPUs, memory (RAM, ROM, PROM, EEPROM, etc.), hard drives, optical drives, audio/video modules and/or data acquisition modules. The type of element(s) and/or arrangement of the element(s) may dictate, in part, a generalized purpose of the platform and/or enable one or more specialized purposes for the platform. In view of the relatively large number of different platform elements and/or configurations of elements, CPU configuration (knob settings, such as $Conf_A$) may play a significant role in the performance of the platform. The example process 400 of FIG. 4 enables, in part, an analysis of any platform of interest in an effort to identify platform operating characteristics that are indicative of operating performance.

A workload of interest ($Wl_X$) is selected by the example workload manager 202 to cause the platform of interest to operate in a predetermined mode (block 404). As described above, the example workload manager 202 configures the example platform 100 to operate under a given set of conditions and/or perform a predetermined series of steps during one or more simulations to allow identification of one or more PMU signatures. The conditions imposed by the example workload manager 202 may include, but are not limited to exercising one or more elements of the example platform 100, stressing one or more CPUs, such as the example CPU 102, performing memory reads/writes at predetermined rates of time and/or bandwidths, etc. After the example workload manager 202 selects a workload of interest (block 404), it may delay execution of the selected workload until after the platform 100 re-initializes under a specific knob setting of interest (block 406).

Knob specific data collection may occur after the workload of interest has been initiated (e.g., after a BIOS setting change and/or reboot of the platform 100), and after a knob configuration has been set for the CPU 102 (block 406). The example knob manager 204 identifies the type of CPU 102 employed by the example platform 100 to determine which knob configuration settings the CPU 102 can accommodate. Knob settings (e.g., $Conf_A$, $Conf_B$, $Conf_C$, etc.) may be unique to each CPU manufacturer, details of which may be stored in the example knob manager 204. Additionally or alternatively, the example knob manager 204 may query a memory, a database, an intranet and/or the Internet to discover details related to available knob settings associated with the CPU 102 used by the platform 100. Each knob configuration setting may trigger and/or otherwise enable/disable one or more features supported by the example CPU 102 such as, but not limited to hardware prefetch settings, second sector (adjacent sector) prefetch settings, snoop filter settings, high-bandwidth memory option settings, hyperthreading settings, power consumption optimization settings, etc. As described in further detail below, PMU data (e.g., PMU counters ($\delta$)) is/are collected while the example platform 100 is executing the workload of interest (e.g., $Wl_A$) under each knob configuration of interest (e.g., $Conf_A$). While the workload of interest does not change during an example training set, the knob configuration may change so that overall platform 100 performance differences may be identified and/or labeled as good, poor and/or any other indicator of performance (block 406).

After PMU data has been collected to obtain one or more samplings (e.g., $S_A$ for $Conf_A$, $S_B$ for $Conf_B$, etc.) for any number of workloads of interest and/or knob configuration settings of interest (block 406), the example dynamic optimizer 104 analyzes the collected PMU data (e.g., sampling $S_A$) to identify PMU signatures (e.g., one or more combinations of PMU counter(s) ($\delta$)) indicative of platform conditions (block 408) (e.g., a platform condition of "good" or "bad"). Identifying platform conditions includes invoking the condition label manager 212 to select data sets having opposing labels (e.g., "good" and "poor") for the same workload (e.g., $Wl_A$) and invoking the example error probability manager 214 to estimate an error probability associated with the PMU signature(s) for that condition. The example error probability manager 214 may also rank the data sets having the opposing labels to determine which pair is associated with the lowest error probability or, in other words, allows the greatest likelihood of discriminating one platform condition from another platform condition.

In the event that there are additional workloads of interest to test with the platform 100 (block 410), the example process 400 returns control to block 404 to select another workload of interest. On the other hand, in the event that all knob configurations of interest have been tested for all workloads of interest (block 410), then control advances to block 412 to determine whether additional platforms of interest are to be analyzed. If so, control returns to block 402 to select another platform of interest.

Figure 5:
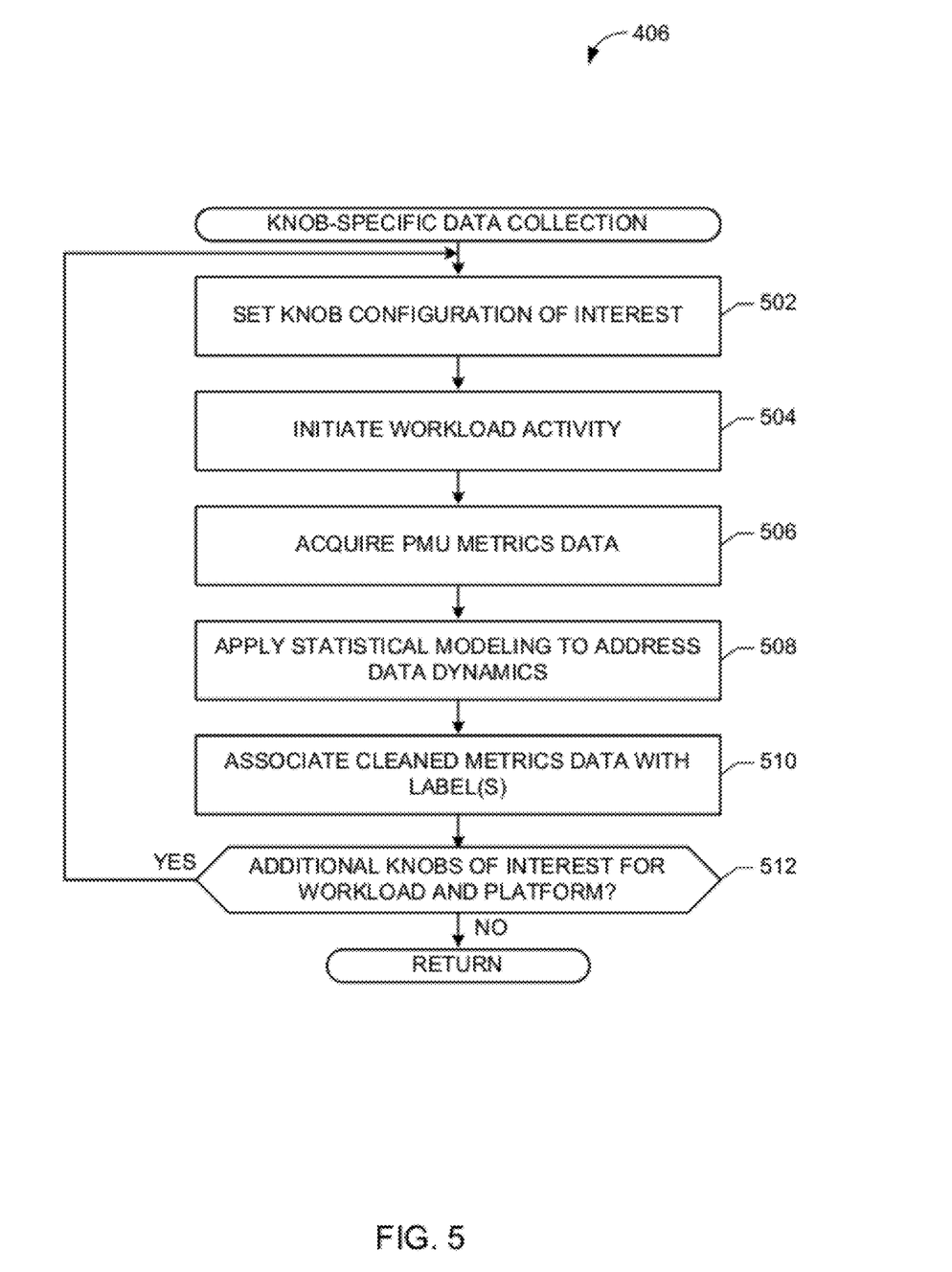

The example process 406 of FIG. 5 illustrates further detail related to knob-specific data collection of FIG. 4. In the example of FIG. 5, the example knob manager 204 selects a knob configuration of interest that is based on the type of CPU employed by the example platform 100 (block 502). The example CPU 102 may allow for any number of different knob settings (e.g., $Conf_A$, $Conf_B$, etc.) to enable, disable and/or optimize one or more features of the CPU 102. Each combination of knob settings may be set by the example knob manager 204 before initiating the workload activity (e.g., $Wl_A$, $Wl_B$, etc.) selected by the example workload manager 202 (block 504). After the workload activity has been initiated for the platform (block 504), the example PMU manager 206 may acquire PMU metrics data (e.g., PMU counter ($\delta$) values) and store such data for later analysis (block 506). PMU metrics data may include, but is not limited to register/counter values of the PMU 112 at a point in time, average register values of the PMU 112 over a time period and/or the specific feature(s) associated with each PMU counter. While the PMU includes any number of counters that identify one or more operating metrics of the CPU 102 (e.g., a number of cache hits, a number of CPU cycles, etc.), the methods and apparatus described herein identify a PMU signature in a manner that is agnostic to what each PMU counter represents. In other words, the combination of unique PMU counter values represents a signature of the PMU as a whole, which may be further associated with an operating condition of the platform while it is being stressed by a workload of interest and tailored by a knob configuration of interest.

In the illustrated example of FIG. 5, the example data cleaning manager 210 cleans the collected PMU signature data by applying statistical modeling techniques to reduce data dynamics issues, such as channel noise (block 508). The statistical modeling techniques may include, but are not limited to one or more statistical techniques described in view of FIG. 3, Gaussian Mixture Modeling to reveal clustering, probability mixture models and/or parametric mixture models. The cleaned data is associated with a label by the condition label manager 212, in which the label is indicative of its performance relative to another unit of measure (block 510). Labels indicative of performance may be assigned based on industry standards, industry expectations and/or target thresholds (e.g., number of CPU cycles per unit of time, number of frames processed per unit of time, etc.). Such labels may be associated with relative terms (e.g., good, poor, satisfactory, optimum, etc.) and/or may be associated with a numeric representation on a number scale (e.g., zero through ten). For example, for a given workload of interest, the example condition label manager 212 assigns one or more PMU signatures with a "good" label when the platform meets and/or exceeds performance expectations (e.g., exceeding minimum performance threshold values for processing speed). The knob settings for the observed platform condition are also associated with the "good" label and saved for later comparison. Additionally, the example condition label manager 212 assigns one or more PMU signatures with a "poor" label when the platform fails to meet performance expectations and associates those knob settings with the "poor" label.

Briefly turning to FIG. 6, an example label table 600 is shown having a workload column 602, a knob settings column 604, a label column 606 and a PMU signature column 608. In the illustrated example of FIG. 6, a training run 610 includes six (6) separate knob settings ("$Conf_A$" through "$Conf_F$") that were all executed under the same workload conditions (workload "$Wl_A$"). Each knob setting label "$Conf_A$" through "$Conf_F$" may represent a combination of CPU features that have been enabled, disabled, triggered and/or otherwise optimized. For each instance of the example platform 100 executing a specific knob setting a corresponding label 606 represents the relative performance ability of the platform to complete and/or otherwise execute the workload "$Wl_A$." For example, when the platform 100 is configured with a combination of knob settings represented by "$Conf_A$," the platform 100 executed the $Wl_A$ workload poorly, as indicated by the "poor" label 612. Similarly, the knob settings represented by "$Conf_F$" also resulted in the platform 100 executing poorly. On the other hand, when the example platform 100 executed the $Wl_A$ workload while configured with the "$Conf_C$" and "$Conf_D$" knob settings, the platform 100 resulted in good performance, as indicated by the "good" labels 614 and 616, respectively. Each setting within the example training run 610 includes a corresponding PMU signature in the PMU signature column 608. While the illustrated example of FIG. 6 shows a relatively small number of PMU counter values (e.g., PMU $R_1$, PMU $R_2$, etc.), the PMU signature resulting from each setting may include any number of counters and corresponding counter values. Such PMU signatures may be saved in, for example, a memory and/or a database.

When all of the knob settings of interest have been tested for the example training run 610, the example dynamic optimizer may configure the example platform 100 to execute an alternate workload. In the illustrated example of FIG. 6, a second training run 618 causes the platform 100 to execute the "$Wl_B$" workload for five (5) separate knob settings ("$Conf_A$" through "$Conf_E$"). Any number of different or additional workloads may be invoked by the example dynamic optimizer 104 in an effort to acquire PMU signatures associated with good labels and bad labels. As described below, the example dynamic optimizer 104 identifies which PMU signatures work the best at accurately identifying which operational state the platform is in so that one or more rules can be invoked to place the platform in a good operating state.

Returning to FIG. 5, after collecting one or more PMU signatures (block 506), cleaning the collected data (block 508) and associating the cleaned data with a label (block 510), the example dynamic optimizer 104 determines whether there are additional knob settings of interest for the currently executing workload (block 512). If so, control returns to block 502 to set the CPU 102 under test with alternate knob settings. Otherwise control advances to block 408.

Figure 7:
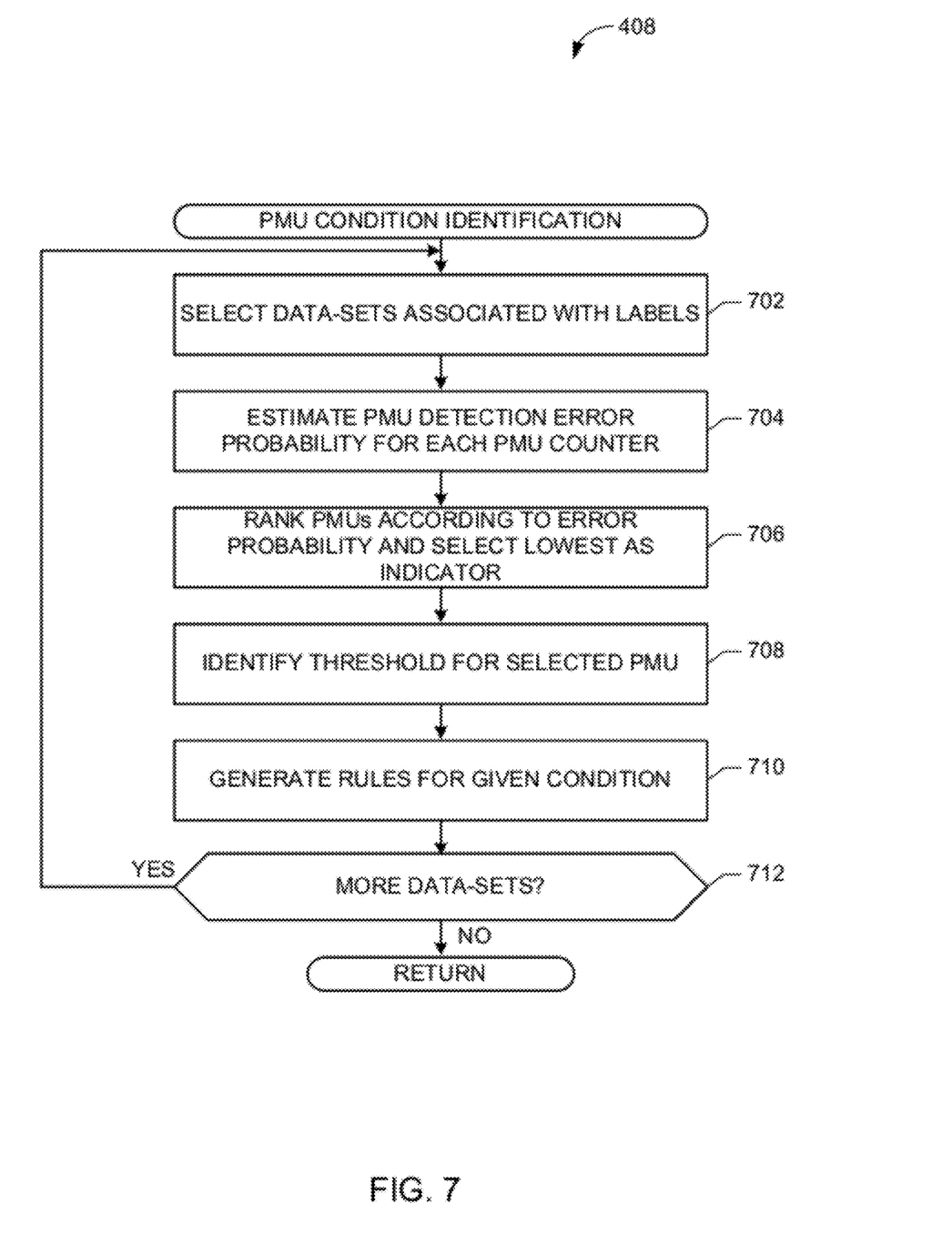

The example process 408 of FIG. 7 illustrates further detail related to analyzing the collected PMU data (e.g., sampling $S_A$) to identify PMU signatures (e.g., one or more combinations of PMU counters ($\delta$)) indicative of platform conditions as shown in FIG. 4. In the example of FIG. 7, the example condition label manager 212 identifies pairs of knob settings having opposite labels (block 702). At least one purpose for identifying pairs of knob settings that exhibit opposite extremes of performance (e.g., good performance versus bad performance) is so that the PMU signatures having the largest difference can be utilized as signals for when the platform is in any given operating condition. In other words, the larger the distance/magnitude is between PMU signatures, the easier it will be for the dynamic optimizer to identify when the platform 100 is operating in any particular state. On the other hand, selecting PMU signatures that do not exhibit a large distance/magnitude will increase the likelihood of erroneous identification of platform operating conditions. As described above, while the illustrated example of FIG. 6 employs human-readable labels of "good," "poor," and/or "satisfactory," the labels employed by the methods and apparatus described herein are not limited thereto. Alternatively, the labels may represent concepts of good performance by, for example, a numeric value of 10 and concepts of poor performance by, for example, a numeric value of 1. Intermediate designations of platform performance may reside anywhere in between the extreme limits of 1 and 10. Without limitation, the extreme numeric limits may encompass any other scale magnitude, such as values between zero and one-hundred.

Returning briefly to the example table 600 of FIG. 6, two knob settings exhibited good performance (i.e., knob settings "$Conf_C$" and "$Conf_D$"), and two knob settings exhibited poor performance (i.e., knob settings "$Conf_A$" and "$Conf_F$"). This example scenario creates four pairs of performance extremes; C-A, C-F, D-A and D-F. The methods and apparatus described herein identify which of these four pairs of performance extremes, and their corresponding PMU signatures, are the best signals to indicate which operating state the platform 100 is in. The example error probability manager 214 employs, for example, Information Theory as described in view of FIG. 3 to determine the optimum PMU counter(s) ($\delta$) to identify good or bad performance based on calculating an error probability for each PMU counter (block 704). Generally speaking, for each PMU counter there is a corresponding probability that a value will occur for that counter/register. A snapshot of any number of PMU counters, if plotted, may reveal a trace of probabilities that represent the PMU signature for a given label (e.g., "good," "bad," etc.).

Figure 8:
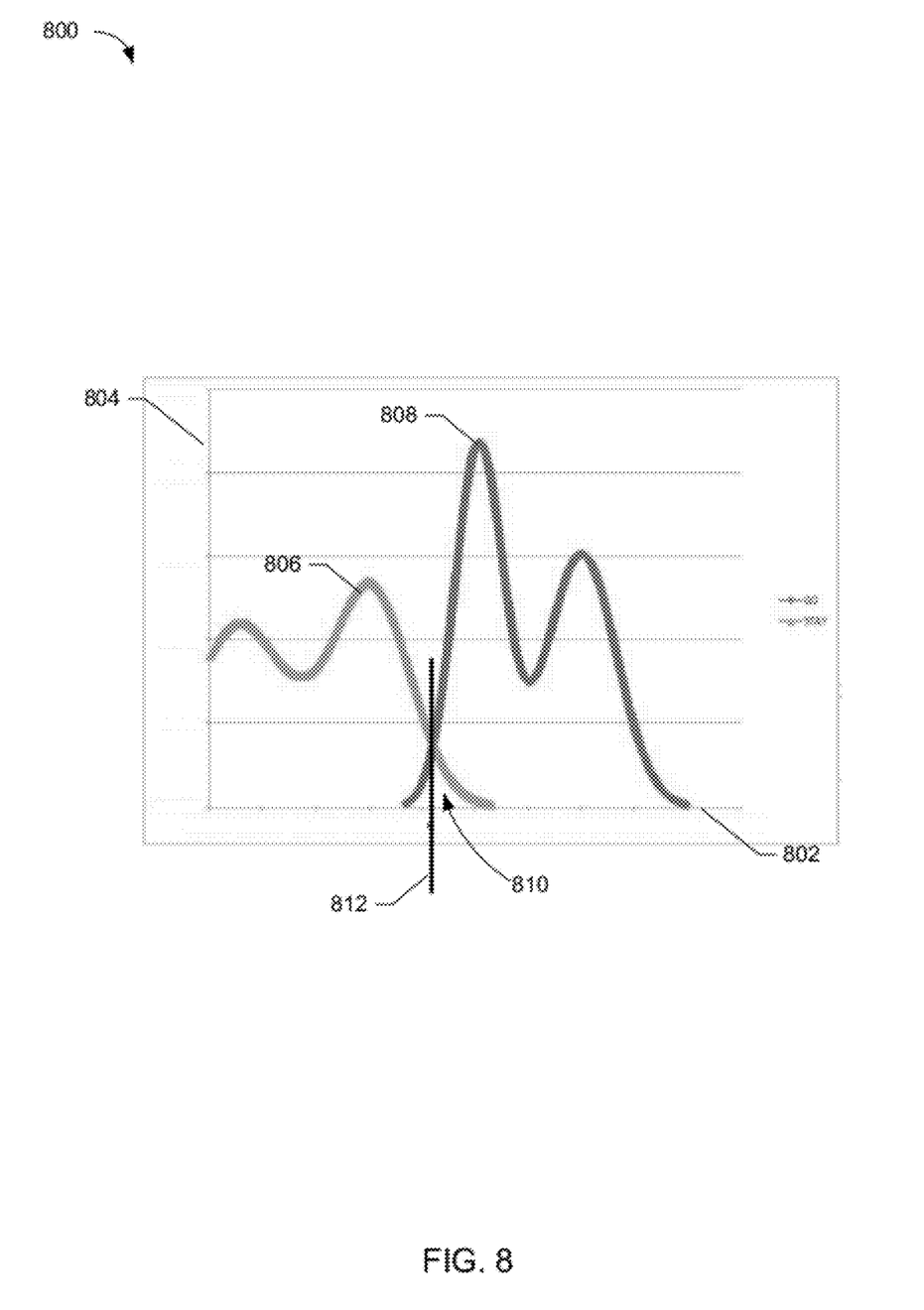
FIG. 8 is an example probability plot that may be generated by the example dynamic optimizer of FIGS. 1 and 2.

Briefly turning to FIG. 8, a probability plot 800 is shown for two performance extremes for the example platform 100. In the illustrated example of FIG. 8, the plot 800 includes an x-axis 802 representing the values of counters of the example PMU 112, and a y-axis 804 representative of a probability value that a corresponding counter will occur. The example x-axis 802 includes a range of symbols for a PMU counter, such that, for example, each symbol in example Equation 5 is present at an interval (or range of points) on the x-axis 802. A first probability trace 806 represents a PMU signature (e.g., a number of individual PMU counters indicative of an operating state) associated with a good operating state, such as when the example platform 100 was executing the $Wl_A$ workload with knob setting $Conf_C$ 614. A second probability trace 808 represents a separate PMU signature that is associated with a poor operating state, such as when the example platform 100 was executing the $Wl_A$ workload with knob setting $Conf_A$ 612. The first probability trace 806 and the second probability trace 808 intersect to reveal a classifier error probability 810, which is a measure of distance between the good operating state and the bad operating state. In effect, the smaller the classifier error probability 810 is (e.g., the smaller the area of overlap between traces), then the better these two PMU signatures are for determining a state of the platform 100. In operation, the example error probability manager 214 calculates each trace probability and ranks PMU signatures according to the resulting classifier error probability, if any (block 706).

The example PMU threshold manager 216 identifies a threshold rule(s) (e.g., a list of threshold values of good or bad performance) so that platform states can be differentiated from good or bad (block 708). For example, the threshold rule(s) may be a range to classify good or bad performance. In the illustrated example of FIG. 8, a midpoint threshold 812 is identified by the PMU threshold manager 216 as the point at which a platform is deemed to be in either the good state or the poor state. PMU signatures may be normalized to readily calculated values when identifying a threshold and/or normalization may occur during a sampling process(es). For example, if the PMU signature associated with the good operating state of the platform is normalized to a value of 5 and the PMU signature associated with the poor operating state of the platform is normalized to a value of 3, then the dead-center threshold value is 2. However, empirical observations and/or training algorithms may be employed to adjust the threshold value when a linear assumption does not produce the best threshold point.

Figure 9:
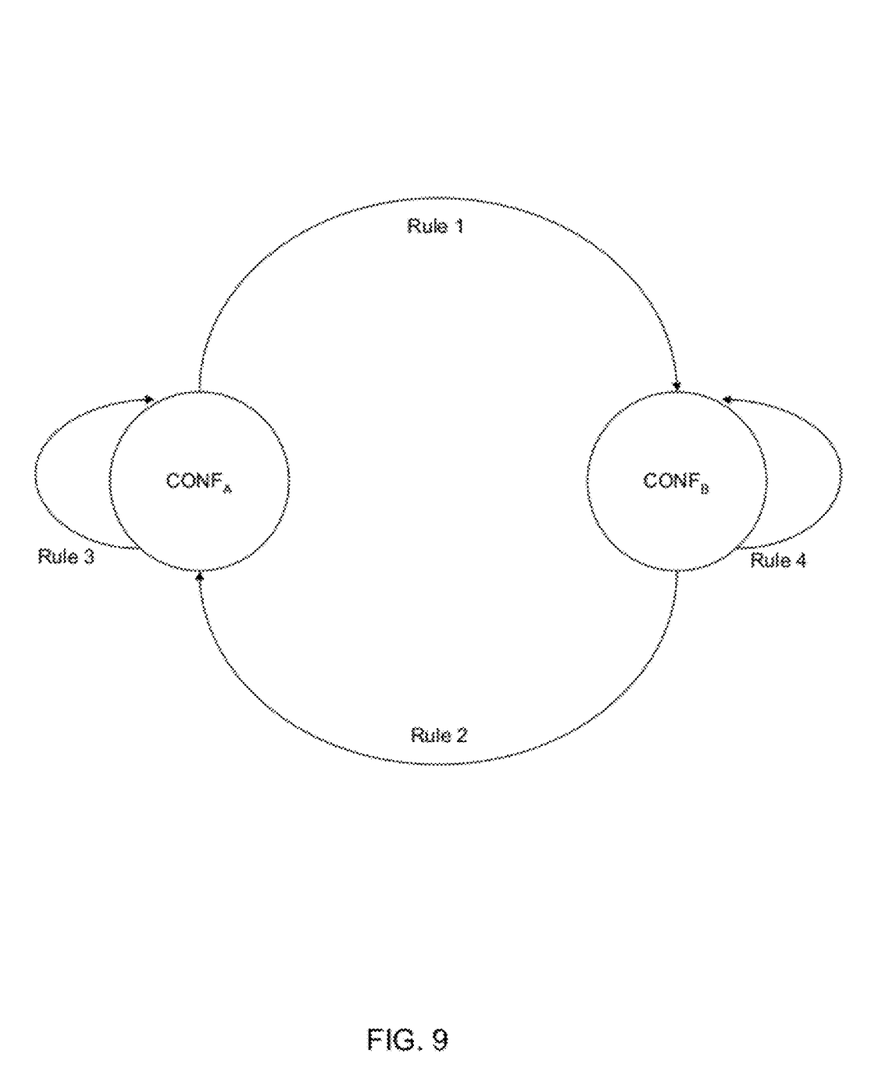
FIG. 9 is an example state diagram that may be generated by the example dynamic optimizer of FIGS. 1 and 2.

In view of the PMU signatures indicative of good performance and bad performance, the example condition rule manager 218 generates rules for each identified condition (block 710). FIG. 9 illustrates a state diagram 900 of example configuration states of the platform 100 and rules to be invoked in response to the detected performance status. During a run time condition of the example platform 100, the dynamic optimizer 104 may identify a PMU signature associated with a performance status, such as poor. In the event of detecting a poor performance status, the example condition rule manager 218 assigns a rule to cause the example platform 100 to change states in a manner that improves performance. For example, the example condition rule manager 218 may assign and/or otherwise configure a rule responsive to the poor status and cause knob settings to change to an alternate configuration likely to improve the platform operating state.

In the illustrated example of FIG. 9, the state diagram 900 includes a first platform configuration state ($Conf_A$), a second configuration state ($Conf_B$), and four rules ($Rule_1$, $Rule_2$, $Rule_3$, $Rule_4$). While FIG. 9 includes two example platform configuration states for purposes of illustration, the example platform 100 may be associated with any number of candidate configuration states and associated rules responsive to the detected states. In the event that $Conf_A$ is associated with a PMU signature having a good label and indicative of a CPU workload $Wl_A$ (or similar), then the example condition rule manager 218 determines what the current knob settings are for the platform 100. Based on the current knob settings, the example condition rule manager 218 may establish a rule to change to an alternate configuration of knob settings or establish a rule to maintain the current knob settings in view of optimum and/or otherwise good platform performance status. For example, after the example condition rule manager 218 identifies that the PMU signature and associated label condition "good" corresponds to training run 610 (see FIG. 6), the condition rule manager 218 determines whether the current knob settings are "$Conf_C$" or "$Conf_D$". In the event that the current knob settings are "$Conf_A$", then the example condition rule manager 218 invokes and/or otherwise creates $Rule_3$ to leave the current knob settings in their current configuration (i.e., knob setting "$Conf_A$"). In other words, example Rule 3 corresponds to a symbol that identifies that the best hardware operating state of the platform occurs while in a configuration state $Conf_A$, assuming that the platform is currently set in the $Conf_A$ configuration state. As such, example Rule 3 illustrates that the current configuration state should not change away from $Conf_A$. On the other hand, in the event that the current knob settings are "$Conf_A$", then the example condition rule manager 218 invokes and/or otherwise creates $Rule_1$ to set the platform 100 knob settings to "$Conf_B$".

In other examples, in the event that $Conf_B$ is associated with a PMU signature having a poor label and indicative of a CPU workload $Wl_A$ (or similar), then the example condition rule manager 218 invokes and/or otherwise creates $Rule_2$ to set the platform 100 knob settings to "$Conf_A$". For each instance of a detected hardware configuration state (e.g., $Conf_A$, $Conf_B$, etc.), the example condition rule manager 218 may establish one or more rules to re-configure knob settings or allow the current knob settings to remain in their current configuration. As described above in view of FIG. 6, while one knob setting (e.g., knob setting "$Conf_C$") performs in a manner indicative of "good" 614 when executing a workload $Wl_A$ or similar, that same knob setting results in performance indicative of "poor" when the platform 100 executes a workload $Wl_B$ (see second training run 618 of FIG. 6) or similar. Accordingly, the example condition rule manager 218 may invoke one or more rules to adjust knob settings in a manner that maintains platform 100 performance at an acceptable and/or optimum level.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method to characterize a platform, comprising:
configuring a processor to operate in a first mode;
executing a workload on the processor;
sampling a plurality of registers associated with a performance monitoring unit (PMU);
transforming the sampled plurality of registers into a probabilistic representation;
partitioning the probabilistic representation into a plurality of discrete output symbols; and
associating one of the plurality of discrete output symbols with the workload based on a probability value associated with the one of the plurality of discrete output symbols.

2. A method as defined in claim 1, further comprising applying a Gaussian Mixture Model to transform the sampled plurality of registers into the probabilistic representation.

3. A method as defined in claim 1, further comprising calculating a probability of the workload for each of the plurality of discrete output signals.

4. A method as defined in claim 3, wherein calculating the probability of the workload further comprises applying Bayes Theorem.

5. A method as defined in claim 3, further comprising mapping the discrete output symbols having a threshold probability to the workload to generate a candidate set of output symbols.

6. A method as defined in claim 5, further comprising ranking the candidate set of output symbols based on an error probability associated with each one of the candidate output symbols.

7. A method to characterize a platform, comprising:
selecting a first workload to be executed by a processor;
configuring the processor to operate in a first processor mode;
acquiring first metric data from a performance monitoring unit (PMU) associated with the processor configured in the first processor mode while the first workload is executing;

transforming the first metric data to a first probabilistic representation;
configuring the processor to operate in a second processor mode;
acquiring second metric data from the PMU associated with the processor configured in the second processor mode while the first workload is executing;
transforming the second metric data to a second probabilistic representation; and
assigning a first platform label associated with the first processor mode and assigning a second platform label associated with the second processor mode.

8. A method as described in claim 7, further comprising:
calculating a first distance between the first probabilistic representation and the second probabilistic representation to determine a classifier error probability.

9. A method as described in claim 8, further comprising:
comparing the classifier error probability between the first and second probabilistic representations with a plurality of classifier error probabilities to identify output signature signals associated with each of the first and second platform labels.

10. A method as defined in claim 9, wherein the first platform label is indicative of good platform performance and the second platform label is indicative of poor platform performance.

11. A method as defined in claim 9, wherein the largest distance is indicative of a measure of success to identify an instance of the first workload.

12. A method as defined in claim 9, further comprising generating a rule to adjust the mode of the processor based on the PMU signature associated with the first workload.

13. A method as defined in claim 7, wherein calculating the first distance further comprises calculating a classifier error probability based on an overlap between the first metric data and the second metric data.

14. A method as defined in claim 13, wherein the classifier error probability is indicative of a probability that a register value of the PMU is inaccurate.

15. An apparatus to characterize a platform, comprising:
a workload manager to initiate a workload for a processor;
a knob manager to configure the processor to execute in a first processor mode at a first time, and a second processor mode at a second time;
a performance monitoring unit (PMU) manager to acquire first PMU metric data at the first time and to acquire second PMU metric data at the second time; and
an error probability manager to transform the first and second PMU metric data to a first and second probabilistic model representation.

16. An apparatus as defined in claim 15, further comprising a condition label manager to assign a first platform label associated with the first probabilistic model representation and assign a second platform label associated with the second probabilistic model representation.

17. An apparatus as defined in claim 16, further comprising a condition rule manager to generate a rule to adjust the mode of the processor based on the PMU metric data associated with the first platform label or the second platform label.

18. An article of manufacture storing tangible machine accessible instructions that, when executed, cause a machine to:
configure a processor to operate in a first mode;
execute a workload on the processor;
sample a plurality of registers associated with a performance monitoring unit (PMU);
transform the sampled plurality of registers into a probabilistic model representation;
partition the probabilistic model representation into a plurality of discrete output signals; and
associate one of the plurality of discrete output signals with the workload based on a probability value associated with the one of the plurality of discrete output signals.

19. An article of manufacture as defined in claim 18 wherein the machine accessible instructions, when executed, cause the machine to apply a Gaussian Mixture Model to transform the sampled plurality of registers into the probabilistic model representation.

20. An article of manufacture as defined in claim 18 wherein the machine accessible instructions, when executed, cause the machine to calculate a probability of the workload for each of the plurality of discrete output signals.

* * * * *